United States Patent
Abali et al.

(10) Patent No.: US 12,554,463 B2
(45) Date of Patent: Feb. 17, 2026

(54) DECODER HAVING MULTIPLE STAGES OF ADDERS TO DECODE DELTA ENCODED DATA

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 18/442,669

(22) Filed: Feb. 15, 2024

(65) Prior Publication Data
US 2025/0265038 A1    Aug. 21, 2025

(51) Int. Cl.
G06F 7/501    (2006.01)
G06F 7/498    (2006.01)
H03M 7/30     (2006.01)

(52) U.S. Cl.
CPC ............ *G06F 7/501* (2013.01); *G06F 7/4985* (2013.01); *H03M 7/6011* (2013.01)

(58) Field of Classification Search
CPC ...... H04N 19/44; H04N 19/91; H04N 19/517; G06F 7/501; G06F 7/4985
See application file for complete search history.

(56) References Cited

U.S. PATENT DOCUMENTS

| | | | |
|---|---|---|---|
| 6,408,421 B1 * | 6/2002 | Benes | H03M 7/40 714/791 |
| 6,775,414 B1 * | 8/2004 | Fogg | H04N 19/91 382/246 |
| 6,865,668 B1 * | 3/2005 | Benes | H04N 19/44 341/67 |
| 11,080,611 B2 | 8/2021 | Singh | |
| 11,113,784 B2 | 9/2021 | Ray | |
| 11,249,761 B2 | 2/2022 | Baum | |
| 11,763,183 B2 | 9/2023 | Singh | |

(Continued)

OTHER PUBLICATIONS

"Drive High Throughput and Low Latency with Next-Generation Network-Optimized Processors," Intel Corporation, Jan. 2023, 5 pp.

(Continued)

*Primary Examiner* — Mirza F Alam
(74) *Attorney, Agent, or Firm* — Konrad, Raynes, Davda & Victor LLP; David Victor

(57) ABSTRACT

Provided are a decoder unit, a decompressor unit, and method for a decoder of multiple stages of adders to decode delta encoded data. A decoder unit implemented in a cache memory having a cache memory cell array comprises a first stage of adder circuits to add, in parallel, pairs of encoded items transformed using a delta encoding, wherein the encoded items include a plurality of deltas of neighbors of sequential source items. The decoder unit further comprises at least one successive stage of adder circuits to add, in parallel in each stage, pairs of outputs from a previous stage of adder circuits, wherein each successive stage has fewer adder circuits than the previous stage, and wherein output from a last of the at least one successive stage comprises the sequential source items.

20 Claims, 11 Drawing Sheets

(56) References Cited

U.S. PATENT DOCUMENTS

| | | | | |
|---|---|---|---|---|
| 2004/0177304 | A1* | 9/2004 | Mathew | H03M 13/4107 |
| | | | | 714/746 |
| 2009/0307250 | A1 | 12/2009 | Koifman et al. | |
| 2010/0208826 | A1* | 8/2010 | Fogg | H04N 19/61 |
| | | | | 375/E7.2 |
| 2012/0151224 | A1 | 6/2012 | Koifman et al. | |
| 2021/0373993 | A1 | 12/2021 | Sharon et al. | |

OTHER PUBLICATIONS

"Method and System to Accelerate Development of HW/SW that Uses in Storage System with Compression," IP.com, IP.com No. IPCOM000254946D, Aug. 15, 2018, 3 pp.

"Partial Chip access with Data Compression for Energy Saving and Performance Improvement," IP.com, IP.com No. IPCOM000266717D, Aug. 12, 2021, 16 pp.

A. Diwan, et al., "Transfer of Robus Header Compression (ROHC) Contexts to Reduce Decompression Losses", IP.com, IP.com No. IPCOM000138432D, Jul. 18, 2006, 6 pp.

A. Ghasemazar, et al., "Thesaurus: Efficient Cache Compression via Dynamic Clustering," ACM, Proceedings of the 25th Int'l Conf. on Architectural Support for Programming Languages and Operating Systems (ASPLOS 2020) 2020, 14 pp.

A.R. Alameldeen, et al., "Adaptive Cache Compression for High-Performance Processors," IEEE, Proceedings of the 31st Annual International Symposium on Computer Architecture (ISCA'04), 2004, 12 pp.

D.R. Carvalho, et al., "Understanding Cache Compression," ACM Transactions on Architecture and Code Optimization, vol. 18, No. 3, Article 36, Jun. 2021, 27 pp.

F. Knorr, et al., "ndzip: A High-Throughput Parallel Lossless Compressor for Scientific Data," IEEE, 2021 Data Compression Conference (DCC), 2021, 10 pp.

G. Pekhimenko, et al., "Base-Delta-Immediate Compression: Practical Data Compression for On-Chip Caches," ACM, PACT '12, Sep. 19-23, 2012, 12 pp.

J. Fang, et al., "An Efficient High-Throughput LZ77-Based Decompressor in Reconfigurable Logic," Journal of Signal Processing Systems, 2020, 17 pp.

L. Villa, et al., "Dynamic Zero Compression for Cache Energy Reduction," 33rd International Symposium on Microarchitecture, Dec. 2000, 7 pp.

S. Hong, et al., "Touche: Towards Ideal and Efficient Cache Compression by Mitigating Tag Area Overheads," arXiv:1909.00553v1, Sep. 2, 2019, 14 pp.

T. Benes, et al., "High Throughput and Low Latency LZ4 Compressor on FPGA," IEEE, 2019, 5 pp.

U.S. Appl. No. 118/442,702 filed Feb. 15, 2024.

List of Patents or Patent Applications Treated as Related, 2 pp., filed herewith.

United States Notice of Allowance dated Aug. 18, 2025, 11 p. in U.S. Appl. No. 18/442,702.

* cited by examiner

DECODER HAVING MULTIPLE STAGES OF ADDERS TO DECODE DELTA ENCODED DATA

BACKGROUND OF THE INVENTION

1. Field of the Invention

The present invention relates to a decoder unit, decompressor unit, and method for a decoder of multiple stages of adders to decode delta encoded data.

2. Description of the Related Art

Data may be encoded using delta encoding which subtracts successive items in a chunk of data, such as bytes in a word of data. For instance, for source data comprising 8 bytes A0... A7, the delta encoding subtracts consecutive items as: A0-0, A1-A0, A2-A1, A3-A2, A4-A3, A5-A4, A6-A5, A7-A6 to produce encoded output B0, B1... B7. To recover the source A values from the delta encoded items B, data is decoded sequential in the following operations, A0=B0, A1=B1+A0, A2=B2+A1, A3=B3+A2... A7=B7+A6. This is the case because $Bi+A(i-1)=(Ai-A(i-1))+A(i-1)=Ai$. Thus, to decode n delta encoded items, there are n sequential decoding operations on each successive encoded data item Bi.

SUMMARY

Provided are a decoder unit, a decompressor unit, and method for a decoder of multiple stages of adders to decode delta encoded data. A decoder unit implemented in a cache memory having a cache memory cell array comprises a first stage of adder circuits to add, in parallel, pairs of encoded items transformed using a delta encoding, wherein the encoded items include a plurality of deltas of neighbors of sequential source items. The decoder unit further comprises at least one successive stage of adder circuits to add, in parallel in each stage, pairs of outputs from a previous stage of adder circuits, wherein each successive stage has fewer adder circuits than the previous stage, and wherein output from a last of the at least one successive stage comprises the sequential source items.

DETAILED DESCRIPTION

Described embodiments improve the latency of delta decoding technology to decode delta encoded items. Prior art delta decoding techniques require n sequential decoding operations of an n item chunk to decode. Described embodiments provide a delta decoder unit having multiple stages of adders working in parallel. While total number of adders are increased, there are fewer stages of adders than the number of operations to sequentially decode the delta encoded items. For instance, the prior art requires n sequential decoding operations on each of the n items. Described embodiments provide a multi-stage decoder of adders to decode the n encoded items in $\log_2(n)$ stages of parallel operations, where output of one stage is input to a next stage. Since $\log_2(n)$ number of operations is substantially less than n sequential operations, described embodiments substantially reduce the latency of delta decoding.

Figure 1:
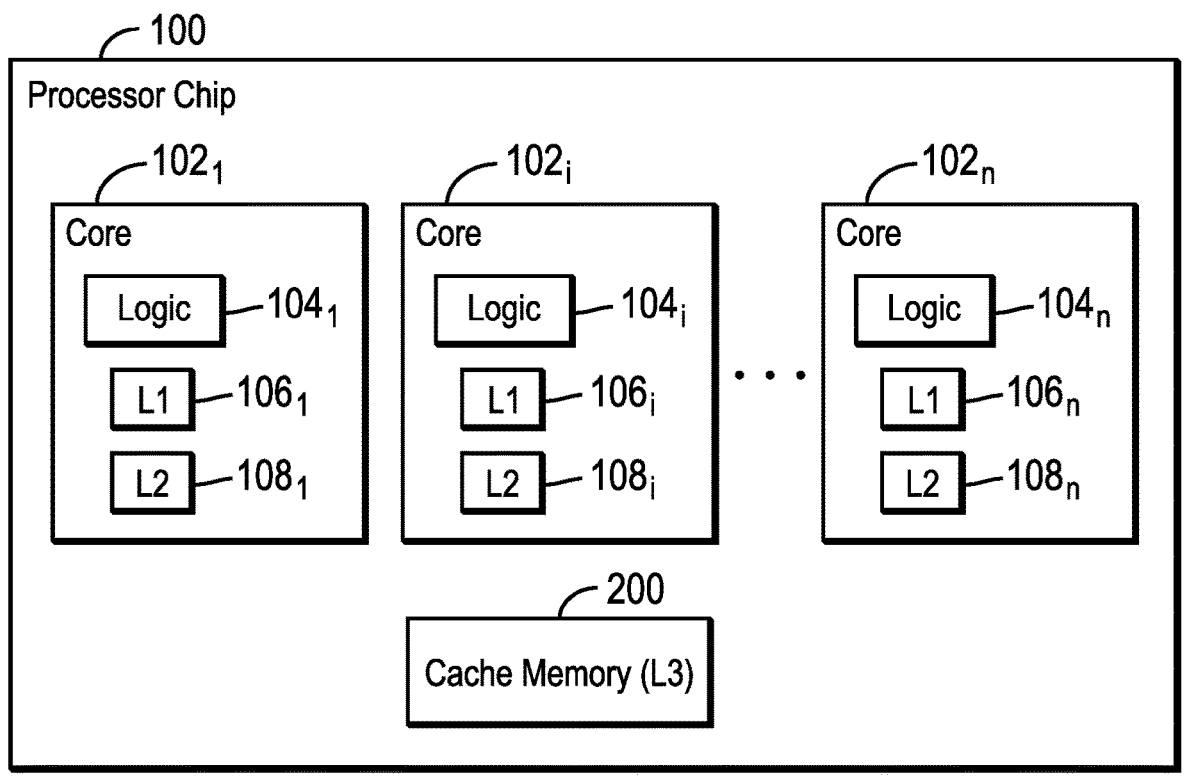
FIG. 1 illustrates an embodiment of a processor chip including multi-level caches.

FIG. 1 illustrates an embodiment of a processor chip 100, in which embodiments may be implemented, including a plurality of processing cores $102_1, 102_i \ldots 102_n$. Each core $102_1, 102_i \ldots 102_n$ has control logic $104_1, 104_i \ldots 104_n$, including core processing functions, such as Arithmetic Logic Units (ALUs) and a memory management unit, and an on-chip L1 cache $106_1, 106_i \ldots 106_n$ and on-chip L2 cache $108_1, 108_i \ldots 108_n$ that are private to the processing cores $102_1, 102_i \ldots 102_n$. The processor chip 100 further includes a last level cache (LLC) 200, also known as an L3 cache, providing a larger storage space to cache data for the L1 and L2 caches in the different cores $102_i$. There may be further levels of caches, such as an intermediate or L4 to cache data for the L3 cache 200. The L3 cache 200 may comprise Dynamic Random Access Memory (DRAM) devices. The processing cores $102_1, 102_i \ldots 102_n$ may write-back modified cache lines from the L2 cache $108_1, 108_i \ldots 108_n$ to the shared last level cache (LLC) 200, shared among the cores $102_1, 102_i \ldots 102_n$, to make room for a cache line evicted from the L1 cache $106_1, 106_i \ldots 106_n$. When modified data needs to be removed from the L2 $108_1, 108_i \ldots 108_n$ to make room for modified data from the L1 cache $106_1, 106_i \ldots 106_n$. a write-back operation is performed to write the data to the last level cache 200.

Figure 2:
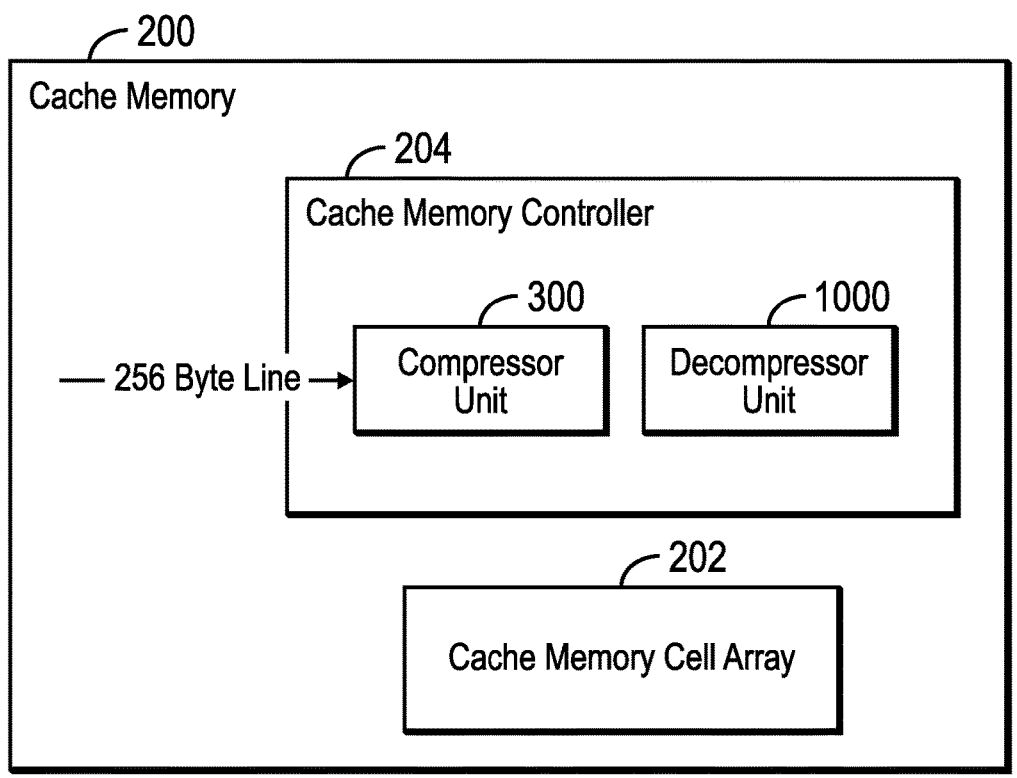
FIG. 2 illustrates an embodiment of a cache memory in the multi-level caches.

With respect to FIG. 2, the L3 cache 200, also referred to as a cache memory, receives cache lines from the L2 cache $106_1, 106_i \ldots 106_n$ to write to a cache memory cell array 202 of cache lines, such as a 256 byte cache line. The cache memory 200 includes a cache memory controller 204 to manage reading and writing data to the cache memory cell array 202, and includes a compressor unit 300 having circuitry to compress received lines of cache to allow the cache 200 to maximize the data that can be stored. A decompressor unit 1000, described with respect to FIG. 10 below, decompresses the compressed data written to the cache memory cell array 202. The cache memory 200 may be implemented in other caching systems than a processor chip 100 of processing cores.

The cache memory 200 may comprise a high-speed data storage layer which stores a subset of data, typically transient in nature, so that future requests for that data are served up faster than is possible by accessing the primary storage location of the data. The cache memory 200 may comprise a volatile or non-volatile memory device, such as a Static Random Access Memory (SRAM), Dynamic Random Access Memory (DRAM), eDRAM (embedded DRAM). Other embodiments may utilize phase change memory (PCM), Magnetoresistive random-access memory (MRAM), Spin Transfer Torque (STT)-MRAM, a ferroelectric random-access memory (Efram), nanowire-based non-volatile memory, and Direct In-Line Memory Modules (DIMMs), NAND storage, e.g., flash memory, Solid State Drive (SSD) storage, non-volatile RAM, etc.

The cache memory controller 204 may be implemented in circuitry in a semiconductor device, such as a Application Specific Integrated Circuit (ASIC), Field Programmable Gate Array (FPGA) in the cache memory controller 204.

Figure 3:
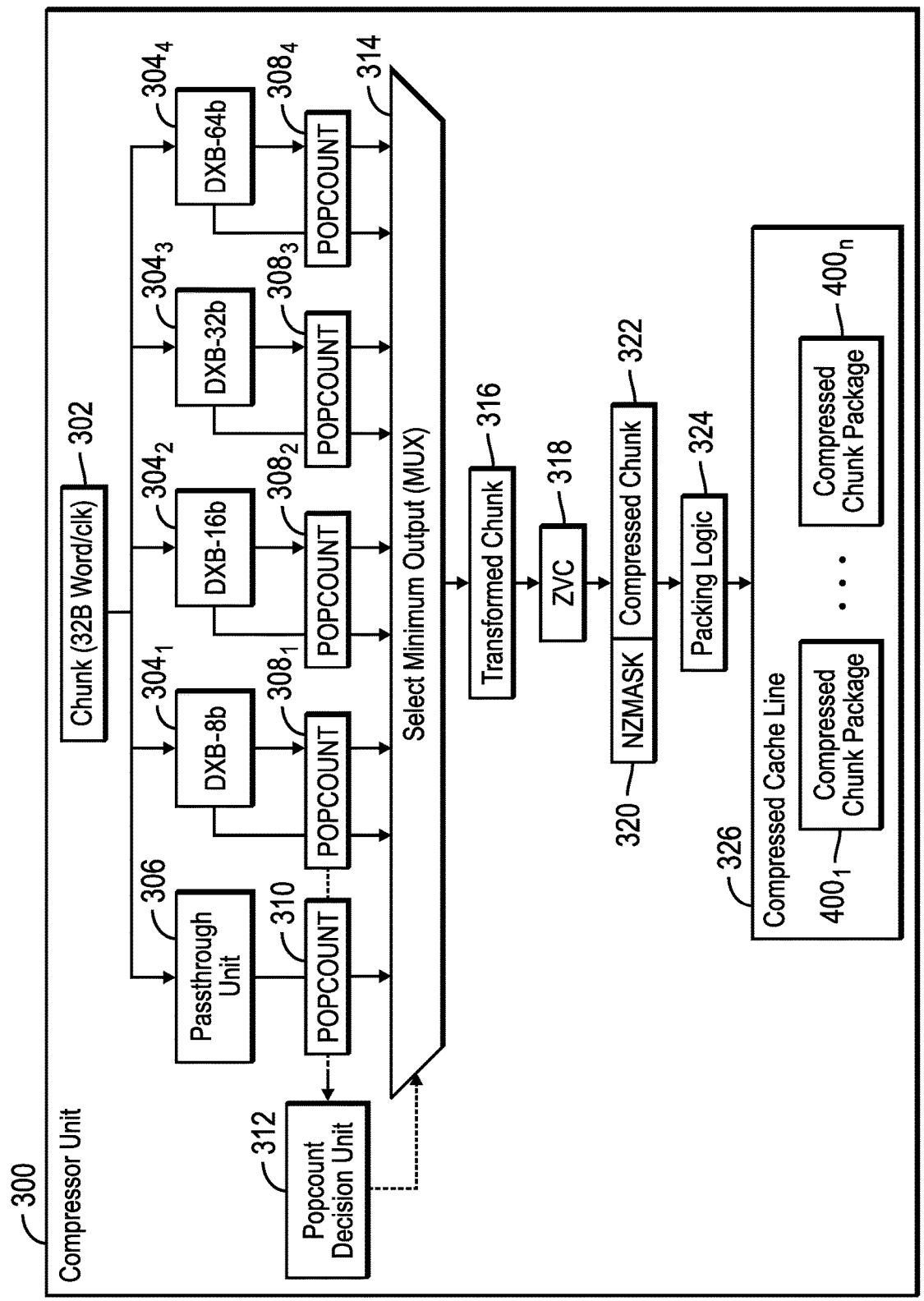
FIG. 3 illustrates an embodiment of a compressor unit implemented in the cache memory.

FIG. 3 illustrates an embodiment of the compressor unit 300 that processes chunks 302 or different words of a cache line, such as eight 32 byte words of a 256 byte cache line. The compressor unit 300 is comprised of data transformers $304_1$, $304_2$, $304_3$, $304_4$, including circuitry to perform different data transforms on the input chunk 302, and one passthrough unit 306 having circuitry to output the received input word 302 without any transformation. Data transformers $304_i$ encode data units of the chunk 302 to increase the number of zeroes in the transformed data units. The data units of the chunk 302 may comprise a bit or one or more bytes. The different data transformers $304_i$ may implement different transform methods or comprise the same method but with different parameters and tuning. For instance, the different data transformers $304_i$ may use the same transform method but process different item size data units of the input chunk 302. For instance, as shown in FIG. 3, the different item size of the data units processed by the data transformers $304_i$ include 8 bytes, 16 bytes, 32 bytes, and 64 bytes.

In one embodiment, the data transformers $304_1$, $304_2$, $304_3$, $304_4$ each implement a combination of a delta, XOR, and bit plane transform, or "DXB". The delta transform may subtract item size bytes in the input word 302 by subtracting all from a single base value or subtracting neighbor values. The XOR transform may XOR the delta transformed bytes, and the bit plane operation may then perform a bit plane transform on the data. In certain embodiments, the difference in the DXB transformers $304_i$ is that they each operate on different data unit sizes, e.g., 8, 16, 32, 64 bytes, of the input chunk 302. In alternative embodiments, different data transforms may be used, and a data transformer $304_i$ may perform only one data transform or a different number and/or type of data transform than the DXB transform combination. The data transformation may involve delta and two-dimensional encoding. In the delta encoding, neighboring data items are subtracted from one another. In two-dimensional encoding, the encoding is performed both vertically (bit-plane) and horizontally (word-plane) and the best of the two dimensions producing the greatest number of zeroes is selected.

The data transformers $304_1$, $304_2$, $304_3$, $304_4$ implement arithmetic/logic operations to transform the data units of the input chunk 302 to a transformed chunk encoded with more zeroes than the input chunk 302. The different transform units $304_1$, $304_2$, $304_3$, $304_4$ may compete in a tournament so the transformed data is selected that results in the minimum number of non-zero-bits.

Each population count unit $308_1$, $308_2$, $308_3$, $308_4$ comprises circuitry coupled to each data transformer $304_1$, $304_2$, $304_3$, $304_4$ and a population count ("POPCOUNT") unit 310 is coupled to the passthrough unit 306. The population count units $308_1$, $308_2$, $308_3$, $308_4$ and 310 count the number of non-zero (NZ) bits in the output from the data transformers $304_1$, $304_2$, $304_3$, $304_4$ and the passthrough unit 306, respectively. The non-zero bits from the population count units $308_1$, $308_2$, $308_3$, $308_4$, and 310 are inputted to a population count (POPCOUNT) decision unit 312, comprising circuitry, that indicates the data transformer $304_1$, $304_2$, $304_3$, $304_4$ or passthrough unit 306 outputting the transformed chunk having a fewest number of non-zero bits. This indication of the data transformer $304_i$ or passthrough unit 306 producing the fewest number of non-zero bits is provided as input to the select minimum output MUX 314, which outputs the transformed chunk 316, having the same byte size as the input word 302, but encoded with a greater number of zeros.

Figure 4:
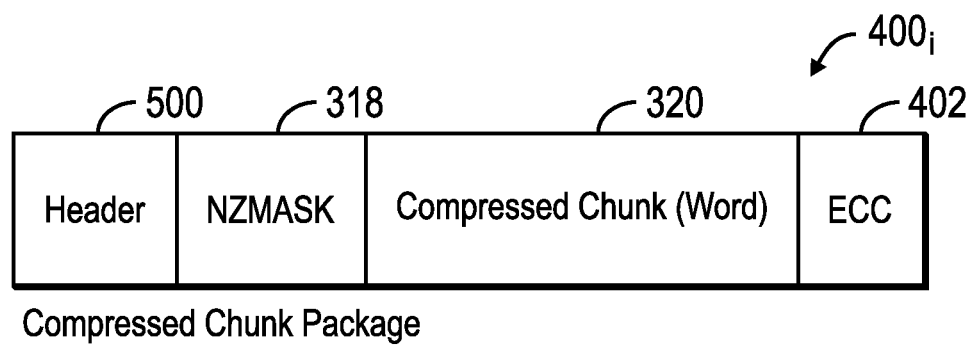
FIG. 4 illustrates an embodiment of a compressed chunk package.

The zero-value compressor 318 compresses the transformed chunk 316, or input chunk 302, to produce the compressed chunk 322 and a non-zero mask (NZMASK) 320 having bits indicating the non-zero values in the transformed chunk 316. Packing logic 324 creates a compressed chunk package 400, as shown in FIG. 4, including a header 500 having metadata on the compressed chunk 322, the non-zero mask (NZMASK) 320, the compressed word 322, and an error correction code (ECC) 402 calculated from an XOR operation on the header 500, NZMASK 320, and compressed word 322. The packing logic 324 may generate a compressed chunk package $400_i$ for each of the n input words 302 processed for a cache line and store all the compressed chunk packages for the cache line in the cache memory cell array 202 to form a compressed cache line 326.

Figure 5:
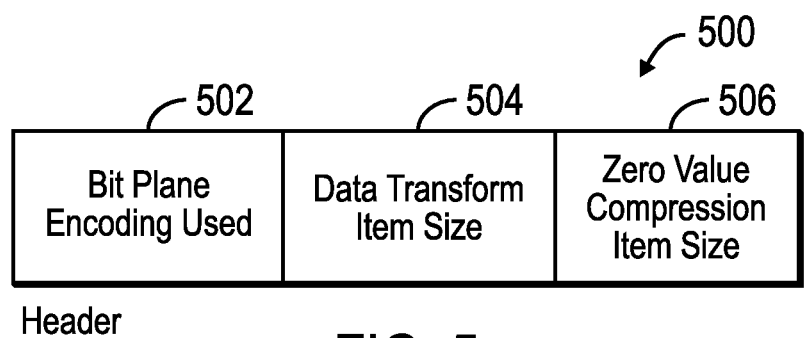
FIG. 5 illustrates an embodiment of a header generated for a compressed chunk.

FIG. 5 illustrates an embodiment of the header 500 in the compressed chunk package $400_i$, and includes a bit plane encoding used flag 502 indicating whether the selected data transformer 304; that outputs the data having the minimum number of non-zero bits performs a bit plane encoding transform; a data transform item size 504 indicating an item size of the data units the data transformer 304; transforms in the input data chunk 302; and a zero-value compression item size 506 indicating a size of the data units in the transformed chunk 316 the zero-value compressor 318 processes to remove data units having a zero value, such as a number of bits or bytes having a zero value.

Figure 6:
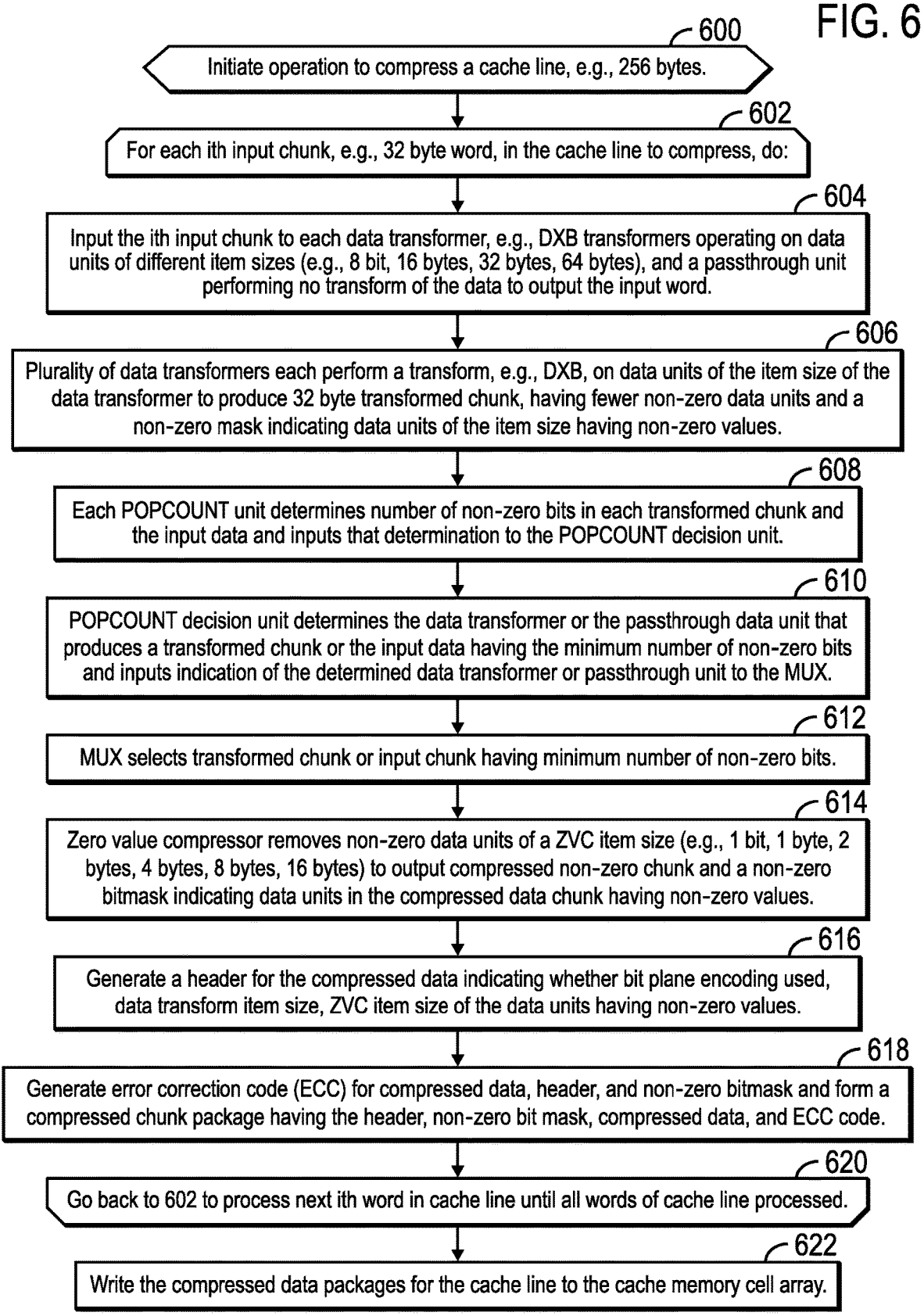
FIG. 6 illustrates an embodiment of operations performed by the compressor unit to compress data for a cache line to store in the cache.

FIG. 6 illustrates an embodiment of operations performed by the compressor unit 300 to compress an input data chunk 302, such as a word, of a cache line to store in the cache memory 200. Upon receiving (at block 600) a cache line to compress, the compressor unit 300 performs a loop of operations 602 through 622 for each input data chunk 302, e.g., 32 byte word, of the cache line to compress. The input data chunk 302 may comprise a word or other sized data unit. The input chunk 302 is inputted (at block 604) to each of the data transformers $304_1$, $304_2$, $304_3$, $304_4$ and the passthrough unit 306. Each data transformer $304_i$ performs (at block 606) a different data transform on the input chunk 302. In one embodiment, the data transformers $304_i$ may perform the same type of transform, e.g., DXB, but perform the transform on different item size data units of the input word 302. The data transformer $304_i$ may increase the number of zeroes in the input chunk 302. Each POPCOUNT unit $308_i$ and 310, coupled to one of the data transformers 304; and passthrough unit 306, determines (at block 608), for the transformed chunk, the number of non-zero bits in the transformed chunk or the input chunk 302 from the passthrough unit 306.

The POPCOUNT decision unit 312 determines (at block 610) the data transformer $304_i$ or the passthrough unit 306 that produces a transformed chunk or input data having the minimum number of non-zero bits and inputs to the MUX 314 indication of the transformer $304_i$ or passthrough unit 306 producing the minimum number of non-zero bits. The MUX 314 selects (at block 612) the transformed chunk 316 or input chunk 302 having the minimum number of non-zero bits to output as the transformed chunk 316 to the zero-value compressor 318. The zero-value compressor 318 removes (at block 614) non-zero data units of a ZVC item size (e.g., 1 bit, 1 byte, 2 bytes, 4 bytes, 8 bytes, 16 bytes) to output the compressed chunk 322 and a non-zero bitmask (NZMASK) 320 indicating data units in the transformed chunk 316 having non-zero values.

Packing logic 324 generates (at block 616) a header 500 for the compressed chunk 322 indicating whether bit plane encoding was used 502 in the data transform, data transform item size 504 of data units in the input chunk 302 transformed, and the zero-value compression item size 506. The ZVC item size 506 may be provided for embodiments using an ensemble of zero-value compressors as described with respect to FIGS. 7, 8, and 9, indicating an item size of the data unit subject to removal if the data unit has a non-zero value. The packing logic 324 further generates (at block 618) an error correction code (ECC) 402 for the compressed chunk 322, header 500, and non-zero bitmask 320 and forms a compressed chunk package $400_i$ having the header 500, non-zero bit mask 320, compressed chunk 322, and ECC code 402. Control then proceeds (at block 620) back to block 602 to process the next ith chunk 302 until all the chunks in the cache line are compressed. All the generated compressed chunk packages $400_1$ ... $400_n$ for the cache line are then written (at block 622) to the cache memory cell array 202.

Described embodiments optimize zero-value compression by having an ensemble of data transformers encode input chunks or words of a cache line with mostly zeroes to produce transformed chunks, and then select a transformed chunk having a minimum number of non-zero values to optimize the zero-value compressor 318, which compresses by removing zero-values. Further, the data transformers $304_i$ transform the input chunk 302 in parallel on same clock cycles, so that the output having the minimum number of non-zero-values, i.e., most zero-values, is selected from transformed data from all the different transforms. In this way, the best transformed data is selected to compress, which may change for different input chunks words, on the same clock cycle.

Figure 7:
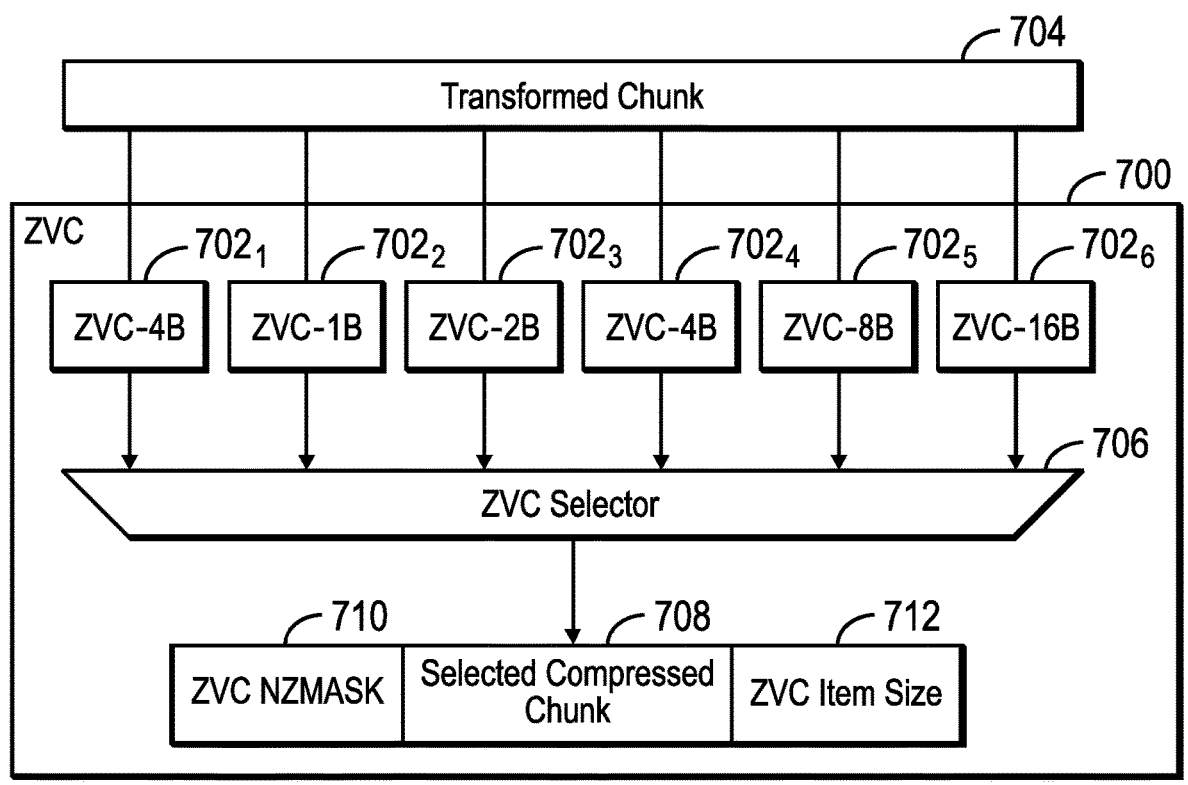
FIG. 7 illustrates an embodiment of an ensemble of zero-value compressors to use for the zero-value compressor in the compressor unit of FIG. 3.

FIG. 7 illustrates an embodiment where the zero-value compressor 318 in FIG. 3 is implemented as a zero-value compressor 700 having an ensemble of different zero-value compressors $702_1$, $702_2$, $702_3$, $702_4$, $702_5$, $702_6$ that each receive a transformed chunk 704, such as transformed chunk 316. Although six zero value compressors $702_i$ are shown there may be any number of multiple zero value compressors $702_i$. Each of the ZVC compressors $702_i$ may process data units of different item sizes, e.g., 4 bits and 1, 2, 4, 8, and 16 bytes, such that a data unit having a zero value, i.e., all zero bits, is removed. For instance, a data unit of a transformed chunk 316 may have a 1 byte data unit of a zero value, but that same 1 byte in a 2 byte data unit may have a non-zero value if there are non-zero bytes in the 2 byte data unit. Each ZVC $702_i$ outputs a compressed chunk and a non-zero mask indicating non-zero data units.

A ZVC selector 706 selects a compressed chunk 708 outputted by one of the ZVCs $702_i$ that has a minimum number of non-zero bits and outputs a non-zero mask (NZMASK) 710 indicating data units of the ZVC item size having non-zero values, and a ZVC item size 712 of the data units subject to zero-value compression. For instance, if the input chunk 302 is 32 bytes and the ZVC item size is 16 bytes, then the NZMASK 710 has two bits, one for each of the 16 byte data units in the compressed chunk 708. The non-zero bitmask 710, compressed chunk 708, and ZVC item size 712 may be sent to the packing logic 324 in FIG. 3 to be included in a compressed chunk package $400_i$ and written to the cache memory cell array 202.

Figure 8:
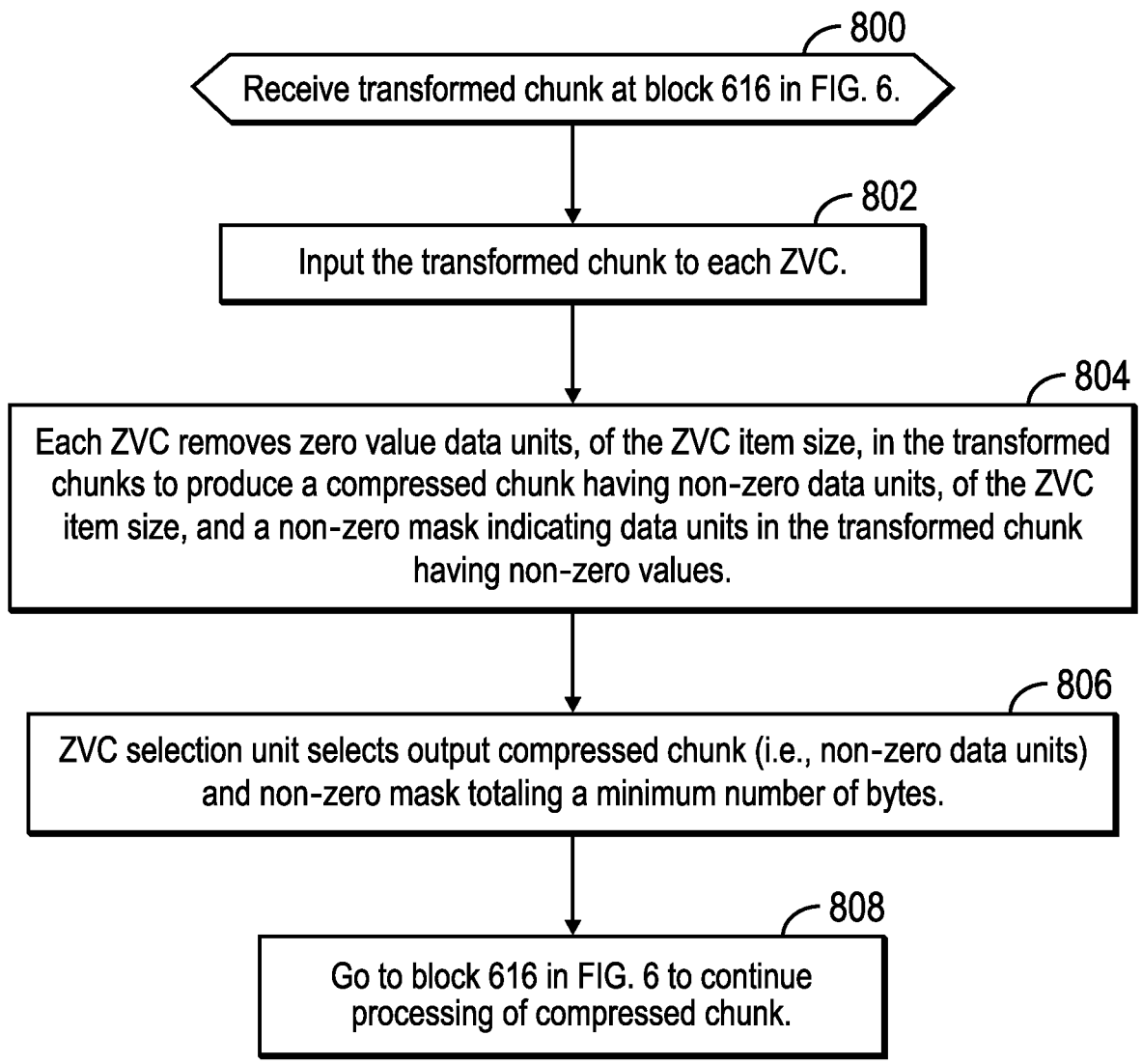
FIG. 8 illustrates an embodiment of operations to use the ensemble of zero-value compressors of FIG. 7 to compress data.

FIG. 8 illustrates an embodiment of operations performed by the ZVC 700 of FIG. 7 to select a compressed chunk 708 from an ensemble of ZVCs $702_i$ having the minimum number of non-zero bits to replace the operation in block 614 in FIG. 6. Upon receiving (at block 800) a transformed chunk 316, the transformed chunk 316 is inputted to each of the ZVCs $702_i$. Each ZVC $702_i$ removes (at block 804) zero value data units, of the ZVC item size for the ZVC $702_i$, in the transformed chunk 316 to produce a compressed chunk having only non-zero data units, of the ZVC item size, and a non-zero mask indicating data units, of the ZVC item size, in the transformed chunk having non-zero values. Each ZVC $702_i$ may remove chunks for data units of different item sizes. The ZVC selector 706 selects (at block 806) an output compressed chunk 708 (i.e., non-zero data units) and non-zero mask 710 for the compressed chunk 708 totaling a minimum number of bytes of the output compressed data and non-zero mask for all the ZVCs $702_i$. Control then proceeds (at block 808) to block 616 in FIG. 6 to continue processing of the compressed chunk 708.

With the embodiment of FIG. 8, an additional dimension of optimization is performed to have multiple ZVCs $702_i$ concurrently compress the transformed chunk for different size data units to determine the ZVC $702_i$ producing the compressed chunk 708 and non-zero bitmask 710 having a minimum number of bits to further optimize the compression to pick a best zero-value compression.

Figure 9:
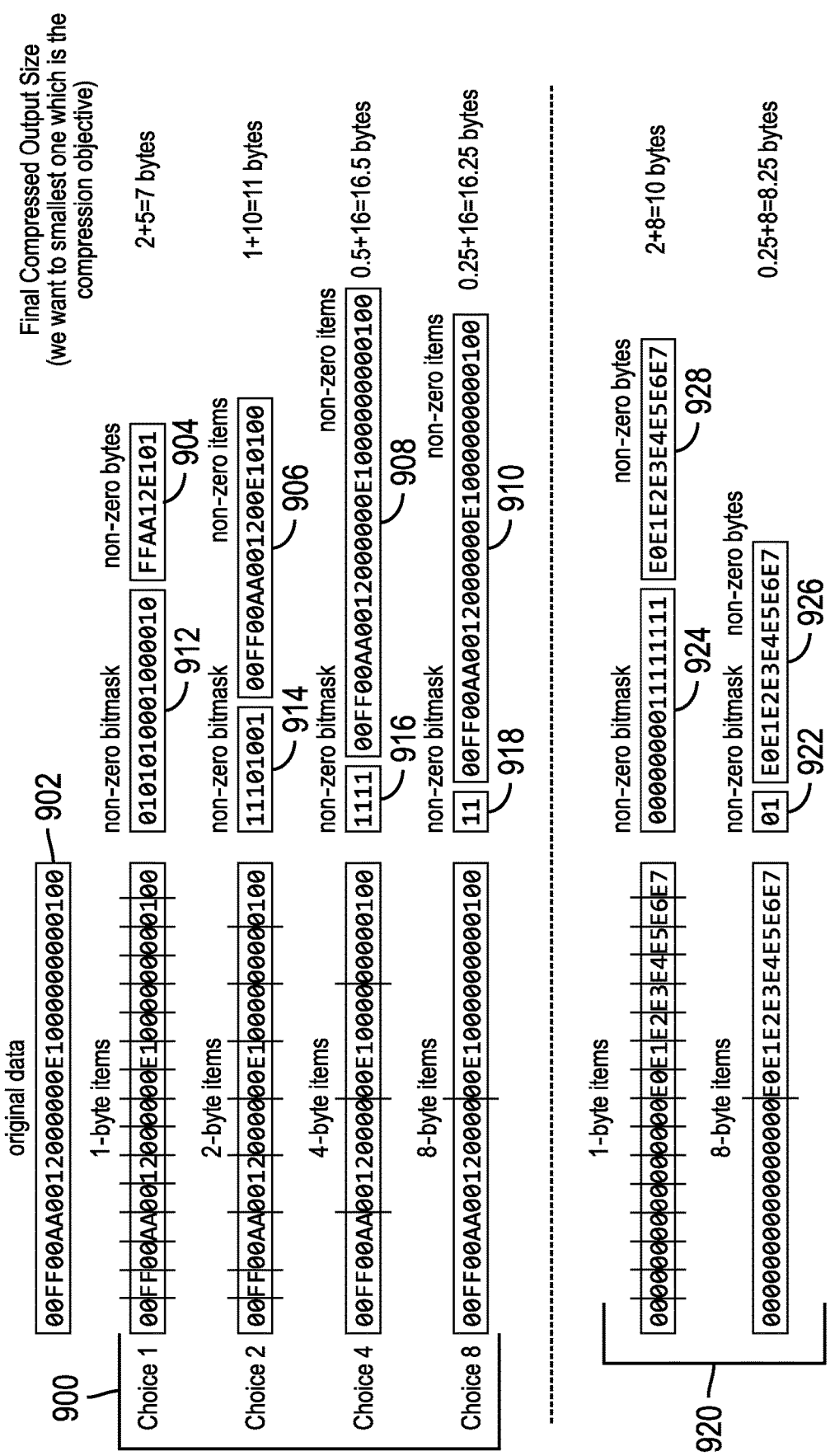
FIG. 9 illustrates a diagram of the result of compressing data with zero-value compressors having different item sizes of the data units removed for having zero values.

FIG. 9 illustrates how using different item sizes resulting in different size data units for the ZVCs $702_i$ produces different size non-zero bitmasks and non-zero values. Section 900 shows how different ZVC item sizes results in different compressed outputs for original data 902. For instances of the four choices 900 of different data unit item sizes of 1, 2, 4, and 8 bytes, the ZVC $702_i$ removing data units of a one-byte item size produces the smallest compressed chunk 904 of non-zero bits, as compared to non-zero items 906, 908, 910, but has the largest size non-zero bitmask 912 of non-zero bitmasks 914, 916, 918. However, the "choice 1" of a one-byte data unit size results in the compressed chunk 904 and non-zero bitmask 912 having the smallest number bytes of the other choices for 2, 4, and 8 byte item sizes of the data units. The second section 920 shows zero-value compression of 1 byte or 8 byte data unit item sizes. The 8 byte data unit size produces a non-zero bitmask 922 having significantly fewer bytes than non-zero bitmask 924 for the 1-byte item size, with compressed data 926 and 928, respectively, having a same number of bytes. Thus, for the initial original data shown in section 920, of the two options in section 920, a zero-value compressor removing 8 byte size zero-value data units results in better compression than using a 1-byte item size data unit, or 10 bytes versus 8.25 bytes.

In certain instances, the item size 504 selected for the data transformer method 304$_i$ may be different than the item size 506 selected for the zero-value compressor.

Figure 10:
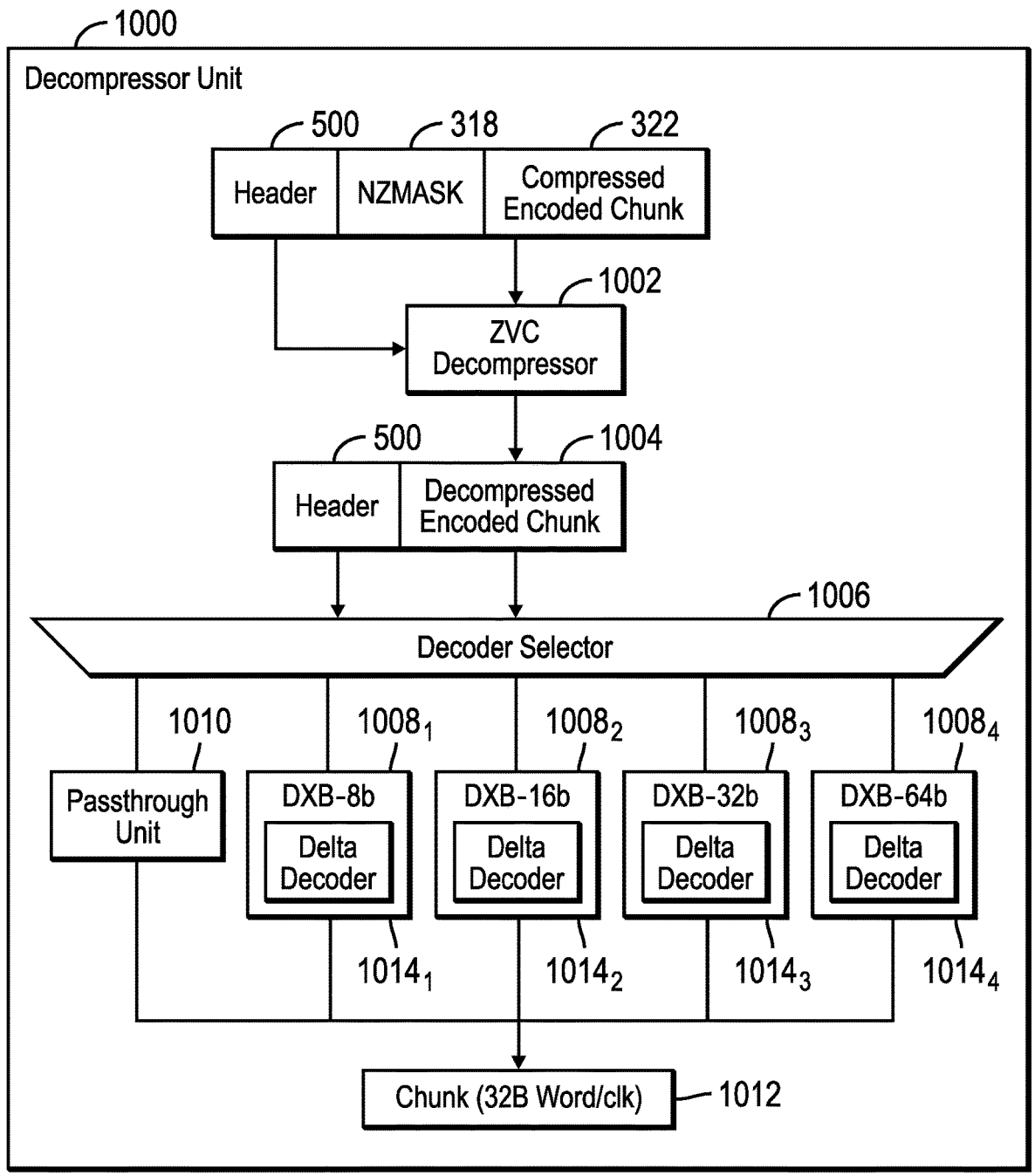
FIG. 10 illustrates an embodiment of a decompressor unit.

FIG. 10 illustrates an embodiment of a decompressor unit 1000, such as the decompressor unit 1000 in FIG. 2, that processes compressed encoded chunks 322 produced by the compressor unit 300, such as eight 32 byte words of a 256 byte cache line. The decompressor unit 1000 is comprised of a ZVC decompressor 1002 to decompress the compressed encoded chunk 322 stored in the memory cell array 202 in a compressed chunk package 400$_i$. The ZVC decompressor 1002 uses the header 500 to identify the ZVC item size 506 used in compressed encoded chunk 322 and the ZVC NZMASK 318, 710 for the compressed encoded chunk 322 to populate the compressed encoded chunk 322 with zero values at locations indicated in the mask 318 to produce a decompressed encoded chunk 1004 with the header 500. The header 500 additionally identifies the data transform item size 504 used in the DXB encoded chunk and whether bit-plane encoding 502 is to be used or not in the decoders 1008$_i$. A decoder selector 1006 determines from the header 500 the data transform item size 504 or other indicator to determine the data decoder 1008$_1$, 1008$_2$, 1008$_3$ . . . 1008$_4$ or the passthrough circuit 1010 to which the decompressed encoded chunk 1004 is forwarded to decode. The passthrough unit 1010 forwards the decompressed chunk 1004 without any data decoding because during compression, the data chunk 302 was not subject to decoding and instead un-encoded through the passthrough unit 306 (FIG. 3). The selected decoder 1008; decodes the data to its original chunk 1012, or chunk 302 in FIG. 3 before compression.

The decoders 1008$_1$ . . . 1008$_4$ include circuitry to perform different decoding operations to decode for different encoding techniques used to encode the data with more zeroes. The decoders 1008$_i$ decode the encoded chunk 1004 to transform the chunk 1004 back to the original source data. The data units of the encoded chunk 1004 may comprise a bit or one or more bytes. The different data decoders 1008$_i$ may implement different decoding methods or comprise the same decoding method but with different parameters and tuning. For instance, the different decoders 1008$_i$ may use the same decoding method but process different item size data units of the encoded chunk 1004. For instance, as shown in FIG. 10, the different item size of the data units processed by the decoders 1008$_i$ include 8 bytes, 16 bytes, 32 bytes, and 64 bytes.

In one embodiment, the decoders 1008$_i$ each implement a combination of a delta decoder 1014$_i$, XOR decoder, and bit plane transform decoder, or "DXB" decoder, which would decode in the order of bit plane transform, XOR, and delta because, in the embodiment of FIG. 3, the encoding was in the order of delta, XOR and bit plane transform. In certain embodiments, the difference in the DXB decoders 1008$_i$ is that they each operate on different data unit sizes, e.g., 8, 16, 32, 64 bytes, of the encoded chunk 1004. In alternative embodiments, different decoders transforms may be used, and a data decoder 1008$_i$ may perform only one decoding operation or a different number and/or type of decoding than the DXB decoding combination. The data transformation may involve delta and two-dimensional encoding.

The decoders 1008$_1$, 1008$_2$, 1008$_3$, 1008$_4$ implement arithmetic/logic operations to decode the encoded chunk 1004 to the original chunk 1012.

Figure 11:
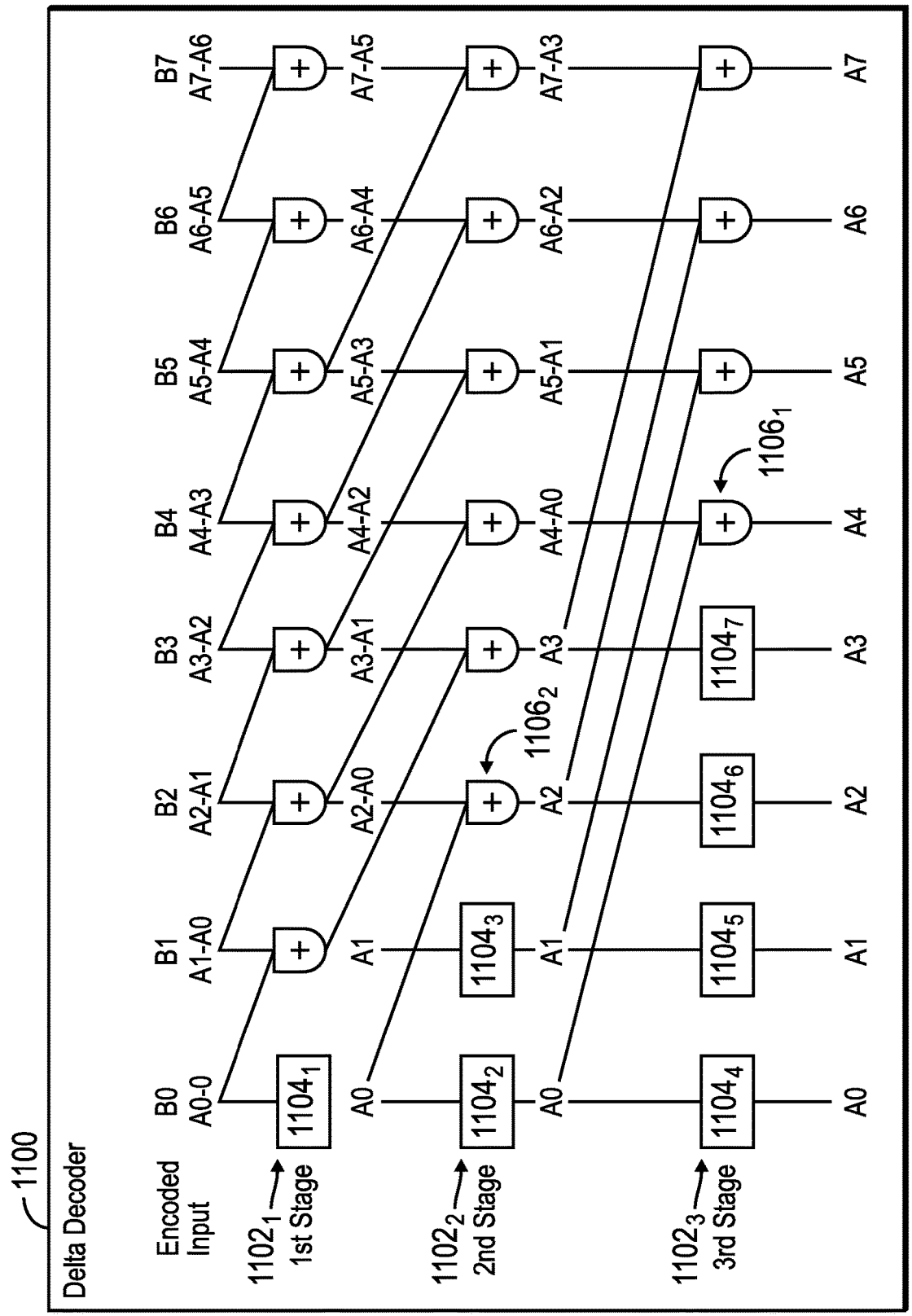
FIG. 11 illustrates an embodiment of a multi-stage delta decoder.

FIG. 11 illustrates an embodiment of a delta decoder 1100 for the 8 byte chunk size delta decoder 10141. In FIG. 11, the initial source data A0. . . A7 and encoded data B0 . . . B7 comprise 8 bytes of data. FIG. 11 shows how the encoded data B0 . . . B7 was created by subtracting each of the eight bytes A1. . . A7 by a neighboring byte A0. . . A6 to the left in the word 302 of A0 . . . A7 bytes. The delta decoder 1100 of FIG. 11 uses the encoded input B0 . . . B7, shown as 1200$_1$ in FIG. 12, to reconstruct the original source A0 . . . A7 at the result output 1202, shown in FIG. 12. The delta decoder 1100 for a word size of eight bytes has three stages 1102$_1$, 1102$_2$, 1102$_3$. Each stage 1102$_i$ includes at least one passthrough unit 1104$_1$, 1104$_2$ . . . 1104$_7$ and a row of adders 1106$_1$, 1106$_2$, 1106$_3$ following passthrough units 1104$_1$, 1104$_3$, 1104$_7$, respectively, which in parallel process decoded data at different stages on the same clock cycle. The output of the stages 1102$_i$ includes one or more recovered source values $A_j$ or the results of the sum of the inputs to the adders, which comprises a subtraction of two source values Ai-Aj.

Figure 12:
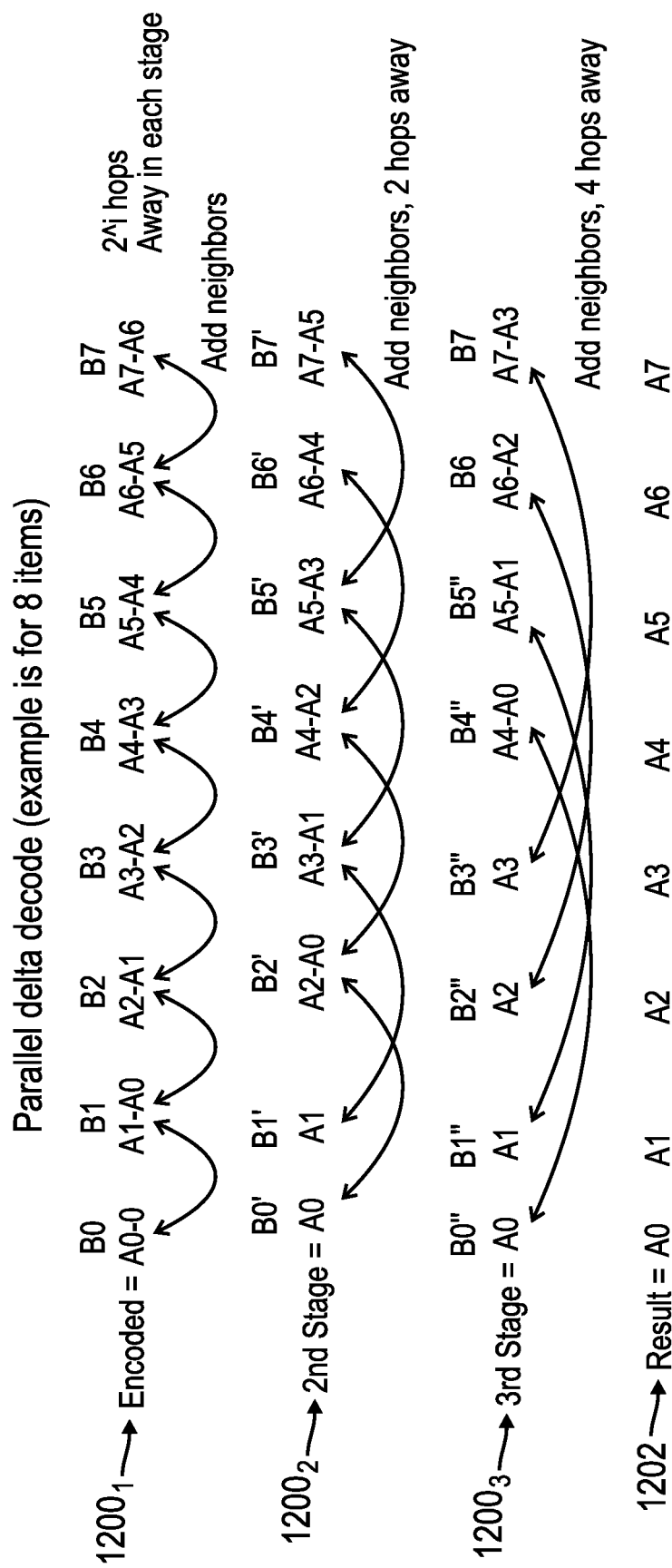
FIG. 12 illustrates an embodiment of a parallel delta decoding operation using the multi-stage delta decoder of FIG. 11 for encoded 8 items, such as 8 bytes of a word.

FIG. 12 illustrates how the source values Ai are combined in each stage at the adders in parallel. In the first stage 1200$_1$ the encoded data B0 . . . B7 is shown as a function of the original source values, where each encoded item comprises the subtraction of two source values Ai-A(i-1). In the first stage 1200$_1$, each encoded item B0 . . . B6 is added, in parallel, to a neighboring encoded item B1 . . . B7 one hop to the right, respectively. In the second stage 1200$_2$, each first stage decoded item B0' . . . B5', resulting from the first stage 1200$_1$ decoding, which can be expressed as the below source values, is added, in parallel, to a neighboring first stage encoded item B2' . . . B7' two hops to the right, respectively. The first stage decoded items B0' and B1' comprise the recovered source values A0 and A1, respectively, which are forwarded to the passthrough units 1104$_2$, 1104$_3$. In the third stage 1200$_3$, each second stage decoded item B0" . . . B3", resulting from the second stage decoding 1200$_2$, which can be expressed as the below source values, is added to a neighboring second stage encoded item B4" . . . B7" four hops to the right, respectively. The second stage decoded items B0" . . . B3" comprise the recovered source values A1 . . . A3, respectively, which are forwarded to passthrough units 1104$_4$ . . . 1104$_7$, respectively. The output of the third stage decoding 1200$_3$ comprises the final decoded source values 1202, or A0 . . . A7.

The circuit structure can be applied to words having any number of units, that are powers of two, such as more than 8 bytes, or 4, 16, 32, 64, et seq. bytes. If the number of bytes or data units comprises n, then there would be $\log_2(n)$ stages. Further, at each stage i, for i=0 . . . (n-1), there are $2^i$ passthrough units followed by $(n-2_i)$ adders. The first $2^i$ inputs to the ith stage are forwarded to passthrough units and the first $2^i$ adders to be combined with inputs $(2^i+1)$ through (n-1), respectively.

Figure 13:
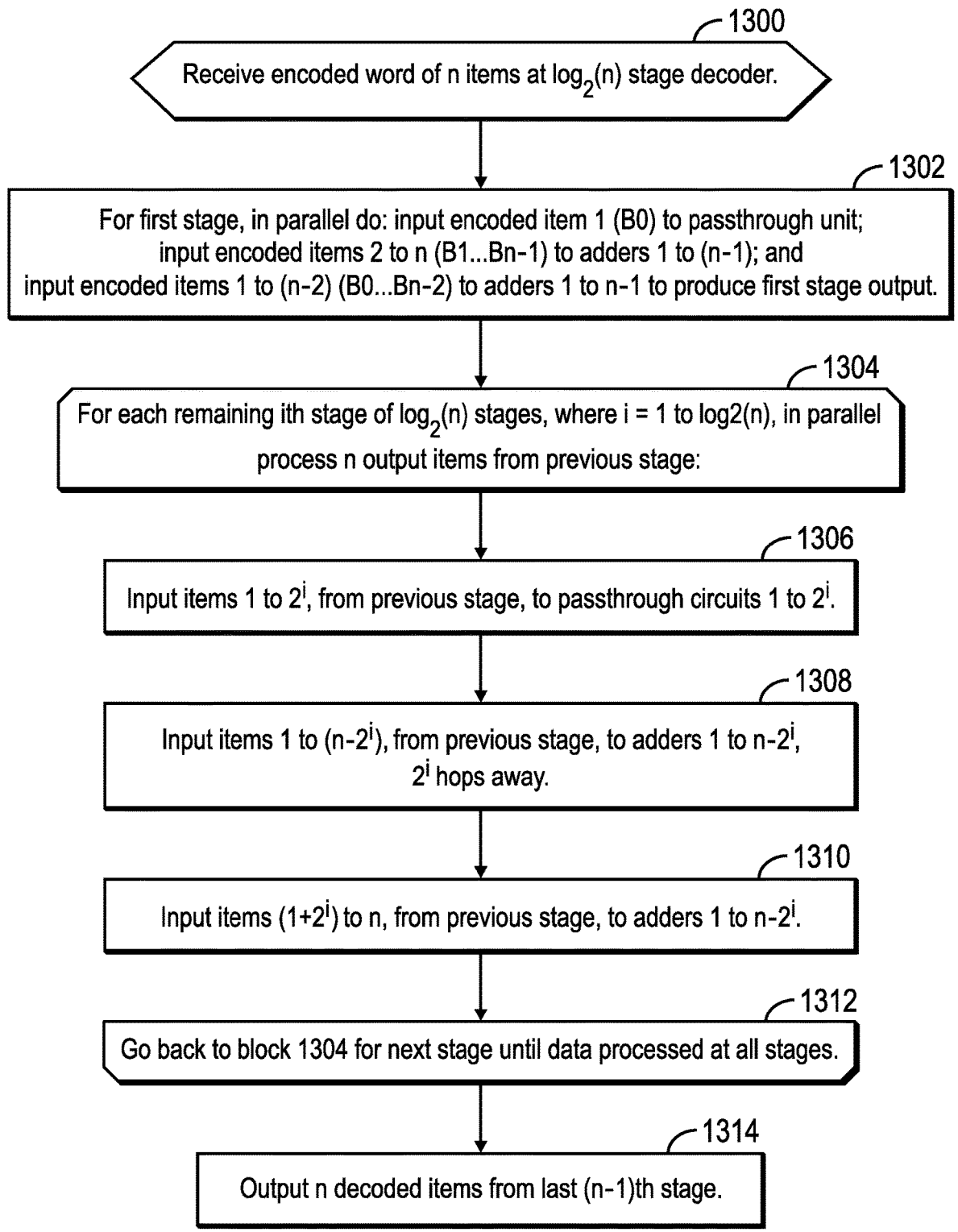
FIG. 13 illustrates an embodiment of operations performed in a multi-stage delta decoder to decode n items in a word, such as n bytes.

FIG. 13 illustrates an embodiment of operations performed by a delta decoder having $\log_2(_n)$ stages to decode a delta encoded word having n items. The encoded item $B^i j$ refers to output from an ith stage for decoded item j, where i=0 refers to the decoded word before subject to the stages of adders. Upon the delta decoder 1014$_i$ receiving (at block 1300) an encoded word of n items at a $\log_2(n)$ stage delta decoder, for the first stage, in parallel the following operations (at block 1302) are simultaneously performed: input the first encoded item $B^0 0$ to the passthrough unit; input encoded items $B^0 1$ . . . $B^0 n-1$ to adders 1 to (n-1) respectively, and input encoded items $B^0 0$ . . . $B^0 n-2$ to adders 1 . . . n-1, respectively, one hop away, resulting in adding $B^0 j+B^0 k$ for j=0 . . . n-2 and k=1 . . . n-1. For each remaining ith stage of $\log_2(n)$ stages, where i=1 to $\log_2(n)$, in parallel process n output items from previous stage (at blocks 1304 through 1312) as follows: input (at block 1306)

items 1 to $2^i$ ($B^i0 \ldots B^i2^i$) from previous stage, to passthrough circuits 1 to $2^i$; input (at block 1308) items 1 to (n–$2^i$) ($B^i 0 \ldots B^i$ (n–$2^i$)), from previous stage, to adders 1 to (n–$2^i$), $2^i$ hops away; input (at block 1310) items (1+$2^i$) to n ($B^i 2^i \ldots B^i$ n), from previous stage, to adders 1 to n–$2^1$, $2^i$ hops away These operations for the ith stage result in adding $B^i j + B^i k$ for j=0 \ldots ($2^i$–1) and k=$2^i$ \ldots n–1. The output from the last stage, $\log_2(n)$ stage, comprises the final decoded output, or A0 \ldots An.

With the above embodiments, the decoding of delta encoded data is optimized by performing in parallel $\log_2(n)$ stages of operations in parallel to reduce the latency over delta decoding techniques that decode data sequentially for each item, requiring n sequential operations. In this way described embodiments, optimize and reduce the latency of delta decoding operations using multiple stages of adders to perform stages of decoding operations in parallel on substantially fewer clock cycles than needed to sequentially decode each delta encoded item.

The letter designators, such as i, n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A decoder unit implemented in a cache memory having a cache memory cell array, comprising:
    a first stage of adder circuits to add, in parallel, pairs of encoded items transformed using a delta encoding, wherein the encoded items include a plurality of deltas of neighbors of sequential source items; and
    at least one successive stage of adder circuits to add, in parallel in each stage of adder circuts, pairs of outputs multiple hops away from a previous stage of adder circuits, wherein each successive stage has fewer adder circuits than the previous stage of adder circuits to add fewer outputs than at the previous stage of adder circuits, and wherein output from a last of the at least one successive stage comprises the sequential source items.

2. The decoder unit of claim 1, wherein the adding, in parallel, pairs of encoded items in the first stage of adder circuits comprises adding, in parallel, each pair of consecutive decoded items to produce first output items.

3. The decoder unit of claim 1, wherein each of the sequential source items comprises a number of bytes of data to encode.

4. The decoder unit of claim 1, wherein there are n encoded items, wherein the first stage of adder circuits comprises n–1 adder circuits to add each consecutive pair of the encoded items to produce n outputs including n–1 added outputs, wherein the at least one successive stage of adder circuits comprises:
    at least one successive ith stage of adders following the first stage, where i=1 \ldots j, and wherein each successive stage adds a pair of outputs from a previous stage $2^i$ hops away.

5. The decoder unit of claim 4, wherein each successive ith stage following the first stage has (n–$2^i$) adders.

6. The decoder unit of claim 4, wherein j=$\log_2(n)$.

7. The decoder unit of claim 4, wherein each stage outputs n items, wherein the first stage includes one passthrough circuit followed by the n–1 adder circuits, wherein the passthrough circuit passes a first input item to first stage output, also including output from the n–1 adder circuits, to a second stage of adder circuits, wherein each successive ith stage following the first stage has (n–$2^i$) adders following $2^i$ passthrough circuits to process output from a previous stage.

8. The decoder unit of claim 4, wherein the encoded items are provided by a decompressor unit in a cache memory controller of the cache memory from a compressed word in a compressed cache line in the cache memory cell array.

9. A decompressor unit implemented in a cache memory having a cache memory cell array, comprising:
    a decompressor to decompress a compressed chunk of encoded items stored in the cache memory cell array to produce an uncompressed encoded chunk of the encoded items, wherein the encoded items are formed using delta encoding and include a plurality of deltas of neighbors of sequential source items; and
    a decoder including: a first stage of adder circuits to add, in parallel, pairs of the encoded items; and
    at least one successive stage of adder circuits to add, in parallel in each stage of adder circuits, pairs of outputs multiple hops away from a previous stage of adder circuits, wherein each successive stage has fewer adder circuits than the previous stage of adder circuits to add fewer outputs than at the previous stage of adder circuits, and wherein output from a last of the at least one successive stage comprises the sequential source items.

10. The decompressor unit of claim 9, wherein the adding, in parallel, pairs of encoded items in the first stage of adder circuits comprises adding, in parallel, each pair of consecutive decoded items to produce first output items, wherein the adding, in parallel, pairs in each successive stage of adder circuits comprises adding items multiple hops away to produce fewer added outputs than at the previous stage of adder circuits.

11. The decompressor unit of claim 9, wherein there are n encoded items, wherein the first stage of adder circuits comprises n−1 adder circuits to add each consecutive pair of the encoded items to produce n outputs including n−1 added outputs, wherein the at least one successive stage of adder circuits comprises:
at least one successive ith stage of adders following the first stage, where i=1 . . . j, and wherein each successive stage adds a pair of outputs from a previous stage $2^i$ hops away.

12. The decompressor unit of claim 11, wherein each successive ith stage following the first stage has (n−$2^i$) adders.

13. The decompressor unit of claim 11, wherein j=$\log_2(n)$.

14. The decompressor unit of claim 11, wherein each stage outputs n items, wherein the first stage includes one passthrough circuit followed by the n−1 adder circuits, wherein the passthrough circuit passes a first input item to first stage output, also including output from the n−1 adder circuits, to a second stage of adder circuits, wherein each successive ith stage following the first stage has (n−$2^i$) adders following $2^i$ passthrough circuits to process output from a previous stage.

15. A method for decoding data in a cache memory having a cache memory cell array, comprising:
adding, by a first stage of adder circuits, in parallel, pairs of encoded items transformed using a delta encoding, wherein the encoded items include a plurality of deltas of neighbors of sequential source items, to produce output items; and
adding, in each of at least one successive stage of adder circuits, in parallel in each stage of adder circuits, pairs of outputs multiple hops away from a previous stage of adder circuits, wherein each successive stage has fewer adder circuits than the previous stage of adder circuits to add fewer outputs than at the previous stage of adder circuits, and wherein output from a last of the at least one successive stage comprises the sequential source items.

16. The method of claim 15, wherein there are n encoded items, wherein the first stage of adder circuits comprises n−1 adder circuits to add each consecutive pair of the encoded items to produce n outputs including n−1 added outputs, wherein the at least one successive stage of adder circuits comprises:
at least one successive ith stage of adders following the first stage, where i=1 . . . j, and wherein each successive stage adds a pair of outputs from a previous stage $2^i$ hops away.

17. The method of claim 16, wherein each successive ith stage following the first stage has (n−$2^i$) adders.

18. The method of claim 16, wherein j=$\log_2(n)$.

19. The method of claim 15, further comprising:
decompressing, by a decompressor, a compressed chunk of encoded items stored in the cache memory cell array to produce an uncompressed encoded chunk of the encoded items, wherein the encoded items are formed using delta encoding and include a plurality of deltas of neighbors of sequential source items, and wherein the compressed chunk of encoded items is provided to the first stage of adder circuits to process.

20. The method of claim 15, wherein the adding, in parallel, pairs of encoded items in the first stage of adder circuits comprises adding, in parallel, each pair of consecutive decoded items to produce first output items.

* * * * *